(12) United States Patent
Fukushima

(10) Patent No.: US 6,798,975 B1
(45) Date of Patent: Sep. 28, 2004

(54) RECORDING APPARATUS AND IMAGE PICKUP APPARATUS

(75) Inventor: Nobuo Fukushima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 919 days.

(21) Appl. No.: 09/692,883

(22) Filed: Oct. 20, 2000

(30) Foreign Application Priority Data

Oct. 29, 1999 (JP) ............................................ 11-308015

(51) Int. Cl.⁷ ............................. H04N 5/91; H04N 5/85
(52) U.S. Cl. ........................................ 386/94; 386/125
(58) Field of Search ................................ 386/94, 46, 1, 386/107, 117, 118, 38, 21, 35, 52, 113, 124, 125, 126, 105, 106, 45; H04N 5/91, 5/85

(56) References Cited

U.S. PATENT DOCUMENTS 4,844,378 A * 7/1989 Oishi .......................... 242/344
5,854,875 A * 12/1998 Yamagishi ................... 386/120

FOREIGN PATENT DOCUMENTS

JP        406261273a    * 9/1994

* cited by examiner

Primary Examiner—Robert Chevalier
(74) Attorney, Agent, or Firm—Cowan, Liebowitz & Latman (57) ABSTRACT

A recording apparatus, to and from which each of a plurality of recording media is attachable and detachable, includes a detection part for detecting a state of an exterior of the recording medium, and a recording part for performing recording of data in the recording medium, wherein the recording part has a first mode of performing recording of data in the recording medium on the basis of a result of detection obtained by the detection part, and a second mode of performing recording of data in the recording medium without using a result of detection obtained by the detection part.

20 Claims, 6 Drawing Sheets

RECORDING APPARATUS AND IMAGE PICKUP APPARATUS

BACKGROUND OF THE INVENTION

1. Field of the Invention

The present invention relates to a recording apparatus in which recording media are interchangeable, and more particularly, to a recording apparatus which performs such a control operation as the writing and erasure of data to and from a recording medium.

2. Description of Related Art

In these days, there are a great number of types of data recording media which are adapted for attachment to personal computers, digital cameras, digital camcorders, etc. Among the data recording media, there exist the ones which resemble each other in shape although different from each other only in thickness.

Accordingly, there is a possibility that a recording medium which is essentially not designed to be attached to a particular apparatus body happens to be attached to the particular apparatus body. In that case, it is probable that the recording medium as attached or data recorded in the recording medium can not be correctly recognized or the data is erroneously erased or destroyed.

In order to prevent such a situation, in most apparatuses, such measures are taken that the size or shape of an insertion slot of the apparatus body is devised to disable the attachment of a different type of card, or the type of a card is detected by a detection mechanism or a communication means to prevent data from being written in or erased from a different kind of card.

However, different kinds of cards which resemble each other in shape and differ from each other in thickness have been put to practical use. A large difference between the two cards resides in that the one card (hereinafter referred to as a type-A card) is provided with an erroneous-erasure prevention lug at an exterior thereof, as shown in FIGS. 6(*a*) and 6(*b*), and the other card (hereinafter referred to as a type-B card) is provided with no erroneous-erasure prevention lug, as shown in FIG. 6(*c*).

Figure 6A:
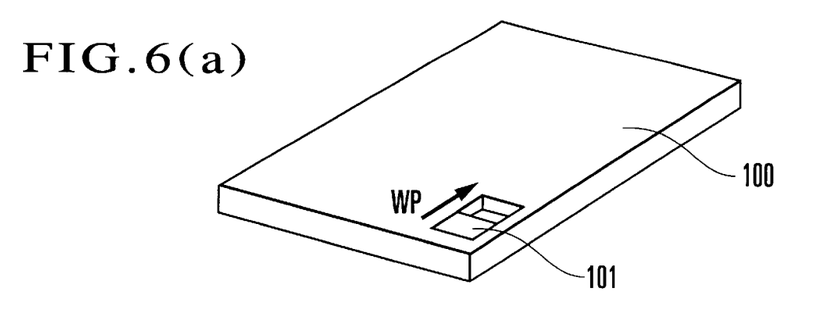
FIGS. 6(a), 6(b) and 6(c) are perspective views showing the appearances of cards.
Figure 6B:
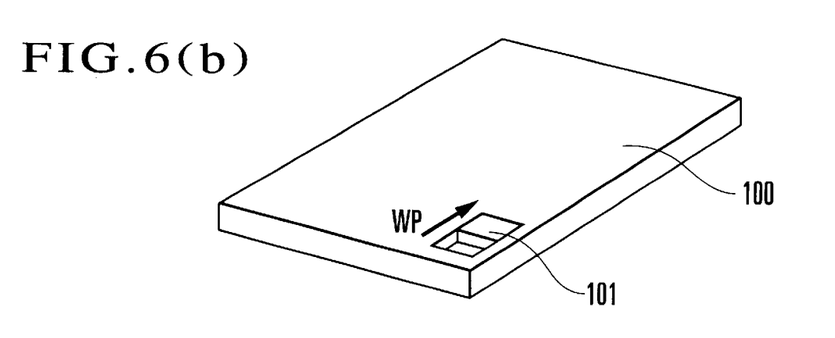
Figure 6C:
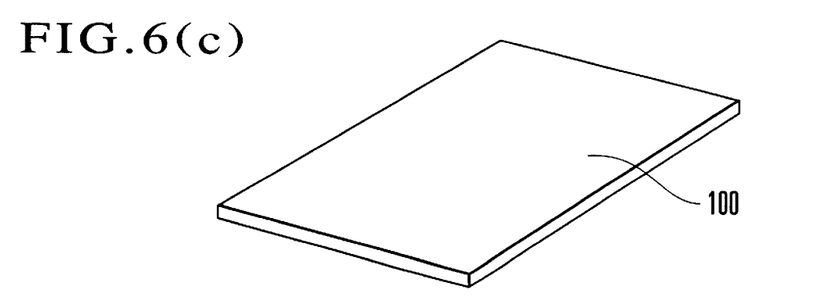

In FIGS. 6(*a*) to 6(*c*), reference numeral 100 denotes a card body, and reference numeral 101 denotes an erroneous-erasure prevention lug. Further, FIG. 6(*a*) shows an erroneous-erasure prevention canceled state in which the prevention of erasure of data is canceled, FIG. 6(*b*) shows an erroneous-erasure prevention state in which the erasure of data is prevented, with the erroneous-erasure prevention lug 101 slidden in the direction of an arrow WP, and FIG. 6(*c*) shows a state in which the position corresponding to the erroneous-erasure prevention lug 101 of the type-A card is covered by an exterior.

Now, since the above-mentioned two types of cards resemble each other in shape, an apparatus body adapted to allow the type-A card to be attached thereto is made also to allow the type-B card to be attached thereto. Therefore, for example, in a case where the apparatus body has an erroneous-erasure prevention lug detecting means which determines the erroneous-erasure prevention state when having detected that the erroneous-erasure prevention lug 101 is located at a position obtained after the sliding thereof, if the type-B card, which has no erroneous-erasure prevention lug mechanism, is attached to the apparatus body, the type-B card is always determined to be in the erroneous-erasure prevention state. Therefore, the writing or erasure of data in or from the type-B card becomes disabled at all.

On the other hand, in a case where the apparatus body has another erroneous-erasure prevention lug detecting means which determines the erroneous-erasure prevention canceled state when having detected that the erroneous-erasure prevention lug 101 is located at a position obtained before the sliding thereof, the type-B card is always determined to be in the erroneous-erasure prevention canceled state. Therefore, in the case of a card having no erroneous-erasure prevention lug mechanism, data recorded in the card, which ought not to be erased, may be erased.

In addition, in a case where the type-B card has an erroneous-erasure prevention mechanism in a method different from that of the type-A card, for example, in a case where the type-B card has the erroneous-erasure prevention mechanism in such a method that the erroneous-erasure prevention state is memorized in a register disposed inside the card, in setting or canceling the erroneous-erasure prevention state, the operator sets or cancels the erroneous-erasure prevention state by rewriting the content of the register by some operation on the apparatus body with the card inserted into the apparatus body.

In a case where, as mentioned above, the apparatus body allows either of the type-A card and the type-B card to be attached thereto, it is necessary for the operator to set the erroneous-erasure prevention state in the respective different methods.

Therefore, with the card attached to the apparatus body, when the apparatus body rejects the writing or erasure of the content of the card, the operator sometimes has difficulty in knowing what is the cause that the writing or erasure is impossible.

BRIEF SUMMARY OF THE INVENTION

Under such a background, it is an object of the invention to provide a recording apparatus capable of appropriately controlling the erroneous-erasure prevention state and the erroneous-erasure prevention canceled state without requiring the operator to perform any troublesome operation.

Further, it is another object of the invention to provide a recording apparatus capable of definitely indicating the reason for the erroneous-erasure prevention state being set, when the operator judges the presence or absence of the setting of the erroneous-erasure prevention state by means of a plurality of detection methods, thereby preventing the operator's mistake.

To attain the above objects, in accordance with an aspect of the invention, there is provided a recording apparatus to and from which each of a plurality of recording media is attachable and detachable, the recording apparatus comprising detection means for detecting a state of an exterior of the recording medium, and recording means for performing recording of data in the recording medium, wherein the recording means has a first mode of performing recording of data in the recording medium on the basis of a result of detection obtained by the detection means, and a second mode of performing recording of data in the recording medium without using a result of detection obtained by the detection means.

The above and further objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 1:
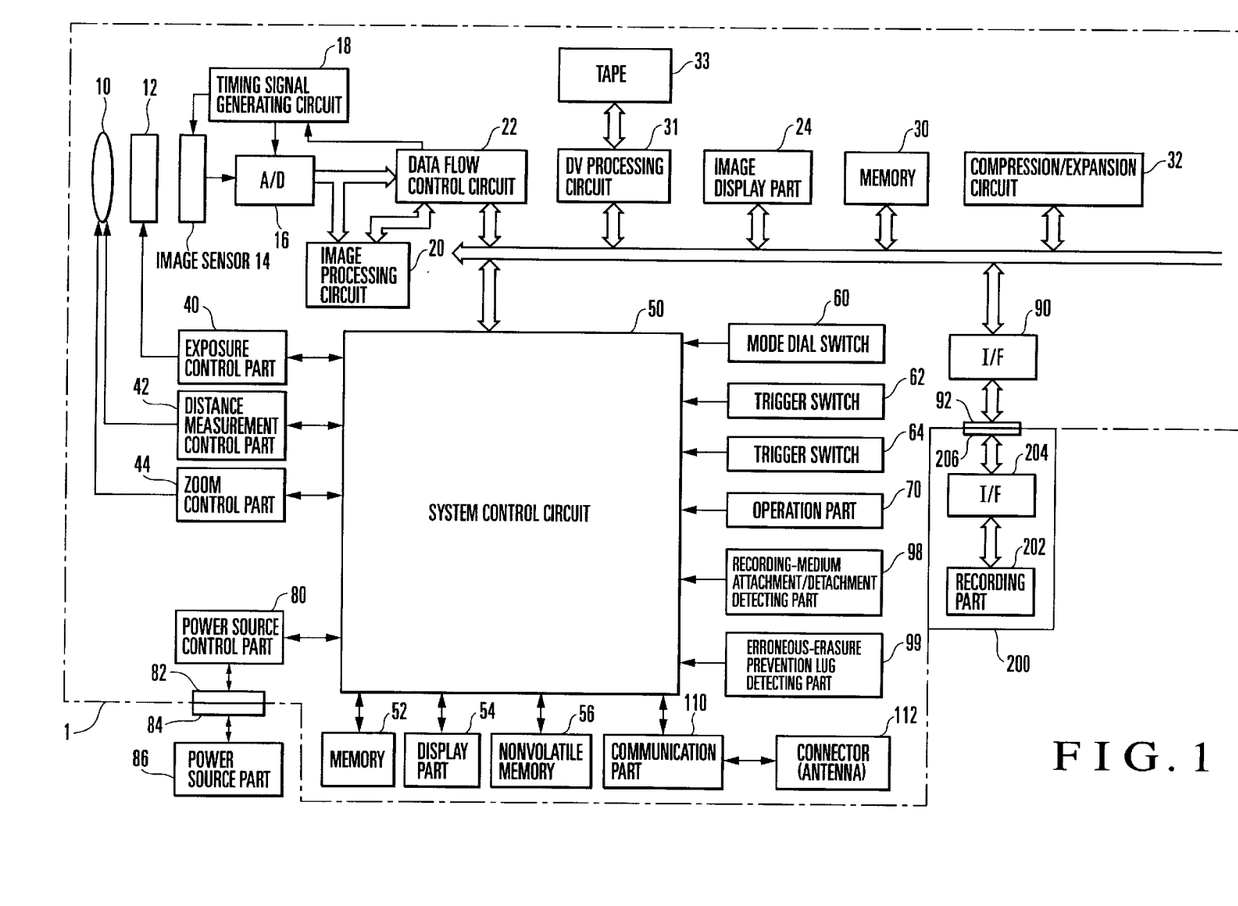
FIG. 1 is a block diagram showing the arrangement of a recording apparatus according to an embodiment of the invention.

FIG. 1 is a block diagram showing the system arrangement of a recording apparatus according to an embodiment of the invention. Referring to FIG. 1, a portion 1 encircled by a one-dot chain line denotes a recording apparatus body. The recording apparatus body 1 includes a photo-taking lens 10, an amount-of-exposure control member 12 such as a diaphragm or a shutter, an image sensor 14 for converting an optical image into an electrical signal, and an A/D converter 16 for converting an analog signal output of the image sensor 14 into a digital signal.

A timing generating circuit 18 supplies a clock signal or a control signal to the image sensor 14 and the A/D converter 16, and is controlled by a data flow control circuit 22 and a system control circuit 50.

An image processing circuit 20 performs a predetermined pixel interpolating processing operation, a predetermined color conversion processing operation, etc., onto data supplied from the A/D converter 16 or data supplied from the data flow control circuit 22. Further, the image processing circuit 20 performs predetermined computing processing operations for controlling the amount of exposure and controlling the distance measurement on the basis of image data.

The data flow control circuit 22 controls the input and output of data among the A/D converter 16, the timing signal generating circuit 18, the image processing circuit 20, an image display part 24, a memory 30, a compression/expansion circuit 32, etc.

Then, during a photo-taking and recording operation, image data outputted from the A/D converter 16 is written into the memory 30 through the image processing circuit 20 and the data flow control circuit 22, or image data outputted from the A/D converter 16 is written into the memory 30 directly through the data flow control circuit 22.

The image display part 24, which is composed of a TFT-LCD (thin-film transistor liquid crystal display) or the like, is arranged to display image data written in the memory 30. Further, if image data obtained by the photo-taking operation is made to be successively displayed at the image display part 24, it is possible to realize the electronic viewfinder function. In addition, it is possible to confirm, at the image display part 24, image data subjected to the various processing operations, such as a color conversion process, by the image processing circuit 20.

The memory 30 is arranged to store a still image or a moving image obtained by the photo-taking operation, and has a sufficient storage capacity for storing a predetermined number of still images or a moving image running for a predetermined time. Further, the memory 30 can be used as a working area for the system control circuit 50.

The compression/expansion circuit 32, which compresses or expands image data, reads image data stored in the memory 30, performs compression processing or expansion processing on the image data, and then writes the processed image data into the memory 30.

A DV processing circuit 31, which is arranged to perform a processing operation for recording data on a magnetic tape 33, for example, a processing operation for converting a signal or adding information with respect to moving-image data read out from the memory 30 so as to cause the data to conform to the digital video format. The magnetic tape 33, serving as a recording medium on or from which image data is recorded or reproduced, is appropriately controlled by a control driving means which controls the transport of the tape 33 and the rotation of a tape drum.

An exposure control part 40 controls the amount-of-exposure control member 12, such as a diaphragm and a shutter. A distance measurement control part 42 controls the focusing of the photo-taking lens 10. A zoom control part 44 controls the zooming of the photo-taking lens 10. The exposure control part 40 and the distance measurement control part 42 are controlled by using the TTL method. Thus, on the basis of a result of computation obtained by computing the picked-up image data with the image processing circuit 20, the system control circuit 50 controls the exposure control part 40 and the distance measurement control part 42.

The system control circuit 50 controls the whole recording apparatus body 1. A memory 52, such as a flash memory or a ROM, stores constants, variables, programs, etc., to be used for the action of the system control circuit 50.

A display part 54 includes a liquid crystal display device which displays the operating state, a message, etc., by using characters, images, sound, etc., according to the execution of a program in the system control circuit 50. The display part 54 is disposed at a single portion or at a plurality of portions in such a position as to be easy to view in the vicinity of an operation part of the recording apparatus body 1, and is composed of, for example, an LCD (liquid crystal display device) or an LED (light emitting diode). In addition, the display part 54 may be further provided with a sound producing part, such as a speaker, so as to output the operating state, a message, etc., by using sounds.

A nonvolatile memory 56, which is electrically erasable and recordable, stores therein the various adjustments values, etc., and is composed of an EEPROM (electrically erasable and programmable read-only memory) or the like.

Operation means 60, 62, 64 and 70 are arranged to input the various operation instruction signals to the system control circuit 50, and are composed of a combination of one or a plurality of ones of a switch, a touch panel, a pointing device using visual-line detection, a speech recognition device, etc.

Here, each of the operation means 60, 62, 64 and 70 will be particularized.

The operation means 60 is a mode dial switch, which is capable of setting and changing the various function modes, such as a power-off mode, a recording mode, a reproduction mode, an erasure mode, etc.

The operation means 62 is a still-image photo-taking trigger switch. The operation means 64 is a moving-image photo-taking trigger switch. The operation means 70 is an operation part, which is composed of the various buttons, a touch panel, etc., including a zoom switch, a menu button, a setting button, a menu shift +(plus) button, a menu shift − (minus) button, a reproduced image shift + (plus) button, a reproduced image − (minus) button, a photo-taking image-quality selection button, an exposure compensation button, etc.

A power source control part 80 is composed of a battery detecting circuit, a DC-DC converter, a switch circuit for changing blocks to be energized, etc., and is arranged to detect the attachment or detachment of a battery, the kind of a battery and the remaining amount of a battery, to control the DC-DC converter on the basis of results of the detection and an instruction from the system control circuit 50, and to supply, to the various parts including the recording medium 33, necessary voltages for necessary periods of time.

The power source control part 80 is provided with a connector 82, which is arranged to be connected with a connector 84 of a power source part 86. The power source part 86 is composed of a battery, an AC adapter, or the like.

The recording apparatus body 1 is provided with an interface 90 to be associated with a recording medium 200, which is composed of a memory card or the like, and a connector 92 to be connected with the recording medium 200. A recording-medium attachment/detachment detecting part 98 is arranged to detect whether the recording medium 200 is attached to the connector 92 of the recording apparatus body 1.

An erroneous-erasure prevention lug detecting part (erroneous-erasure prevention state detecting part) 99 is arranged to detect the state of an erroneous-erasure prevention lug (erroneous-erasure prevention mechanism) of the recording medium 200 attached to the connector 92.

A communication part 110 has the various communication functions including RS232C, USB, IEEE1394, wireless communication, etc.

A connector 112 is used when the recording apparatus body 1 is connected to another apparatus or is used as an antenna when wireless communication is performed.

The recording medium 200, which is composed of a memory card or the like, is provided with a recording part 202 composed of a semiconductor memory, a magnetic disk or the like, an interface (I/F) 204 used for communication with the recording apparatus body 1, and a connector 206 used for connection with the recording apparatus body 1.

Next, the operation of the recording apparatus according to the present embodiment is described with reference to the flow charts of FIGS. 2 and 3. Control operations shown in the flow charts of FIGS. 2 and 3 are executed by a CPU disposed in the system control circuit 50 according a program beforehand stored in the memory 52.

Figure 2:
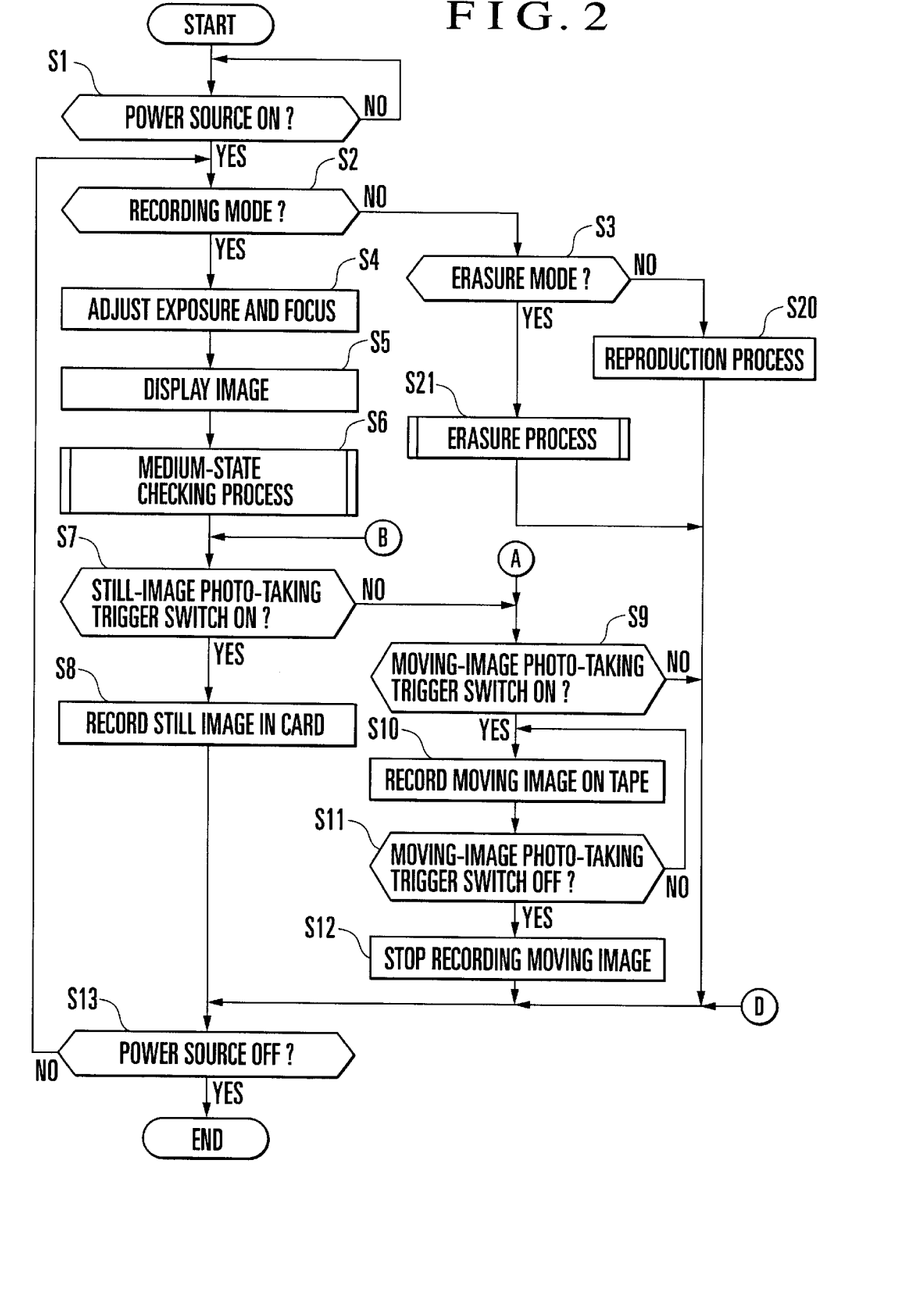
FIG. 2 is a flow chart showing the action of photo-taking of a still image or a moving image in the recording apparatus according to the embodiment of the invention.
Figure 3:
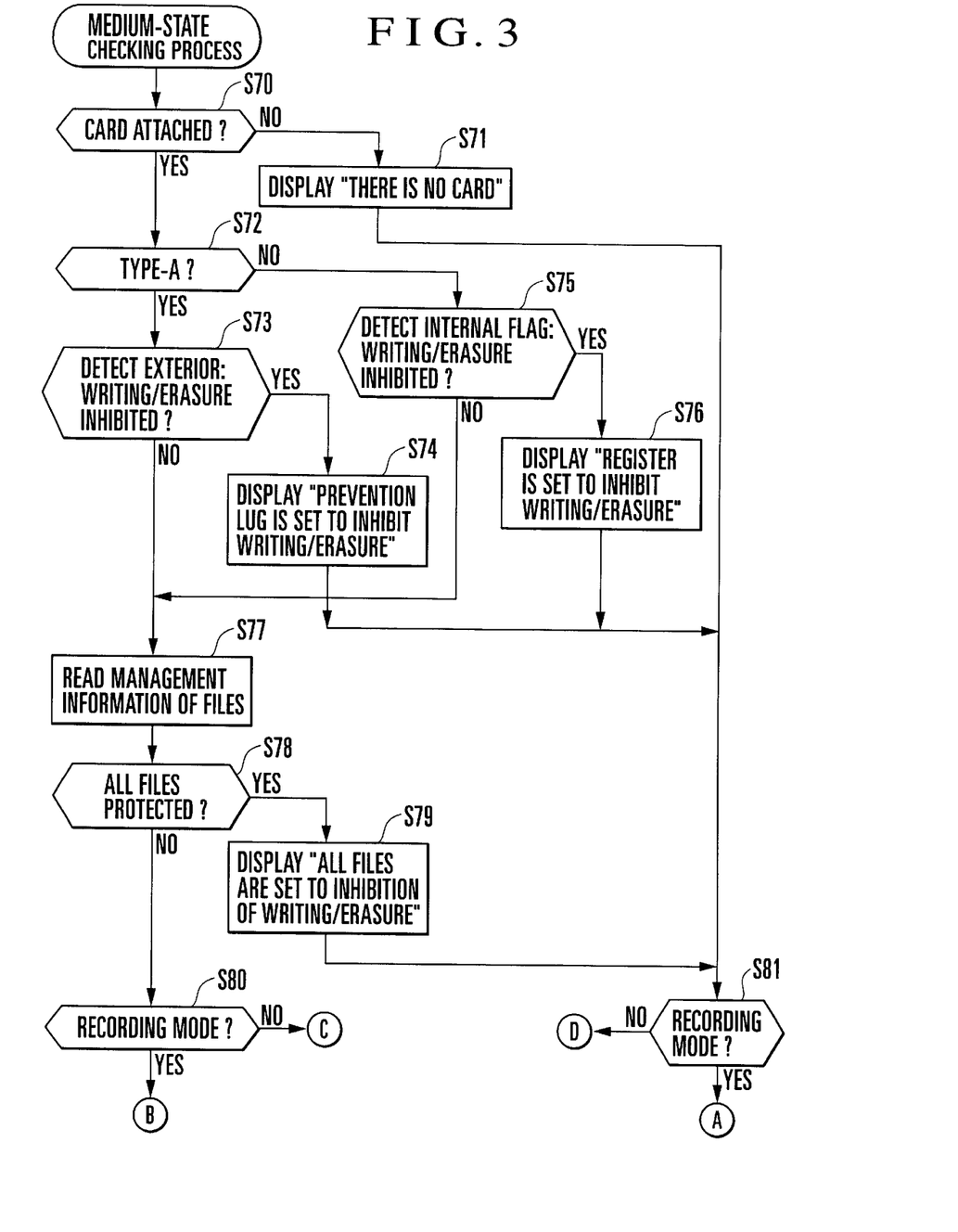
FIG. 3 is a flow chart showing the action of a medium-state checking process in the recording apparatus according to the embodiment of the invention.

First, the operation of picking up a still image or a moving image with the recording apparatus serving as a camera is summarized with reference to the flow chart of FIG. 2. Incidentally, when a mode dial connected to the mode dial switch 60 is set at the position corresponding to each of the power-off mode, the recording mode, the reproduction mode and the erasure mode, the corresponding mode is settable in the recording apparatus.

Referring to FIG. 2, in step S1, the mode dial switch 60 is detected to find if the power source is turned on. If it is found in the step S1 that the power source is turned on, the procedure proceeds to step S2, where a check is made to find if the mode dial is set at the position corresponding to the recording mode. If it is found in the step S1 that the power source is turned off, the procedure waits for the power source to be turned on.

If it is found in the step S2 that the mode dial is set at the position corresponding to the recording mode, a recording mode sequence beginning with step S4 is executed.

If it is found in the step S2 that the mode dial is not set at the position corresponding to the recording mode and, further, it is found in step S3 that the mode dial is not set at the position corresponding to the erasure mode, i.e., if the mode dial is set at the position corresponding to the reproduction mode, a reproduction mode sequence beginning with step S20 is executed. Then, the procedure proceeds to step S13.

If it is found in the step S3 that the mode dial is set at the position corresponding to the erasure mode, the procedure proceeds to step S21, where an erasure mode sequence is executed. The erasure mode sequence will be described later with reference to the flow chart of FIG. 4.

In step S4, a starting process for the recording mode sequence is performed. Thus, if the recording apparatus has been in the reproduction mode until now, the reproduction mode is canceled and the action of adjusting the amount of exposure on the image sensor 14 and the action of adjusting the focusing of the photo-taking lens 10 are made effective.

In step S5, the action of the image display part 24, such as a liquid crystal viewfinder, is made effective, so that a picked-up image is displayed on the viewfinder.

In step S6, a medium-state checking process for the recording medium 200 is performed. The medium-state checking process will be described later with reference to the flow chart of FIG. 3.

In step S7, the state of the still-image photo-taking trigger switch 62 is checked. If the still-image photo-taking trigger switch 62 is turned on, the procedure proceeds to step S8, where a still image is recorded in the recording medium 200 (memory card). Then, the procedure proceeds to step S13.

If it is found in the step S7 that the still-image photo-taking trigger switch 62 is in the off-state, the procedure proceeds to step S9, where the state of the moving-image photo-taking trigger switch 64 is checked. If the moving-image photo-taking trigger switch 64 is turned on, the procedure proceeds to step S10, where a moving image is recorded on the tape 33. Then, in step S1, a check is made to find if the moving-image photo-taking trigger switch 64 is turned off. If the moving-image photo-taking trigger switch 64 is turned off, the procedure proceeds to step S12, where the moving-image recording action is brought to a stop. Then, the procedure proceeds to step S13.

The operation of the whole recording apparatus in outline has been described above.

Next, the medium-state checking process in the step S6 shown in FIG. 2 or in step S210 shown in FIG. 4 will be described in detail with reference to the flow chart of FIG. 3.

Referring to FIG. 3, in step S70, whether a card is attached to the recording apparatus body is detected.

Such detection is performed in the following method. In a case where the card is provided with a CD (card detection) terminal which is exclusively disposed at a part of the connection terminal between the card the recording apparatus body, the state of the CD terminal is detected through a port of the CPU or the like of the recording apparatus body (the recording-medium attachment/detachment detecting part 98 shown in FIG. 1). Normally, the CD terminal is grounded on the side of the card.

Further, a CD-terminal port of the CPU of the recording apparatus body is set at high level when the card is not attached. Accordingly, the attachment of the card is decided by detecting the level of the CD-terminal port of the CPU of the recording apparatus body becoming high when the card is attached. In a case where the card is not provided with the CD terminal, the recording apparatus body communicates with the card for a certain period of time (for a predetermined length of time), and if the communication is performed correctly, the attachment of the card is decided.

If it is found in the step S70 that the card is not attached to the recording apparatus body, the procedure proceeds to step S71, where a display indicating that the card is not attached, for example, a display "THERE IS NO CARD", is made at the display part 54. Then, the procedure proceeds to step S81.

If it is found in the step S70 that the card is attached to the recording apparatus body, the procedure proceeds to step 72, where the type of the card is discriminated. In other words, in step S72, a check is made to find if the card as attached is a card of the first type in which an erroneous-erasure prevention lug mechanism exists on an exterior thereof (type-A card) or a card of the second type in which the erroneous-erasure prevention lug mechanism does not exist on an exterior thereof (type-B card). If the card as attached is the type-A card, the procedure proceeds to step S73. If the card as attached is not the type-A card (i.e., if the card as attached is the type-B card), the procedure proceeds to step S75.

Here, the erroneous-erasure prevention lug mechanism of the type-A card is assumed to be of the slide type, for example, as in an erroneous-erasure prevention lug mechanism of a 3.5-inch floppy disk for personal computers, as shown in FIGS. 6(a) and 6(b). However, the erroneous-erasure prevention lug mechanism may be of the type in which a lug is to be broken off, as in a VHS video tape cassette, or may be of the type in which a tape is to be stuck. Thus, the type-A card is a recording medium in which, on an appearance thereof, the same function as the erroneous-erasure prevention lug exists. Here, the method of detecting the erroneous-erasure prevention lug mechanism is temporarily referred to as the exterior detection method.

Then, it goes without saying that it is necessary to prepare, on the side of the recording apparatus body, a detection mechanism corresponding to the mechanism of a card medium supposed to be attached.

In addition, the type-B card is a card having information indicative of whether writing or erasure is possible, in a register or file in the inside of the card, without having the erroneous-erasure prevention lug mechanism on an appearance thereof. Here, the method of detecting such information is temporarily referred to as the internal flag detection method.

The type-A card may be provided with the internal flag detection method of the type-B card in addition to the exterior detection method. Here, a card having the exterior detection method is regarded as the type-A card, and a card not having the exterior detection method is regarded as the type-B card.

To set the type-A card to the inhibition of writing/erasure, the operator operates a lug or slide switch of the card. On the other hand, in the case of the type-B card, the inhibition of writing/erasure is set by the operation of the recording apparatus body or a personal computer with the card attached to the recording apparatus body or the personal computer. Such a setting operation has relevance to the user interface on application software in the recording apparatus body or the personal computer, and may be performed in the various manners.

Here, the method of setting the erroneous-erasure prevention is not mentioned. Further, here, the erroneous-erasure prevention means not only the inhibition of erasure but also the inhibition of additional writing, over-writing, or the like.

Next, the method of discriminating whether the card as attached is the type-A card or the type-B card, at the recording apparatus body, is described. As such a method, for example, since a register in the inside of the card (temporarily referred to as the card information register) is provided with a portion in which the type of the card is set forth, the recording apparatus body communicates with the card to read the card information register, thereby deciding the type of the card.

Since such a discriminating method is common in the field of PC cards (PCMCIA), the detailed description thereof is omitted here.

In the step S73, as the card is provided with the erroneous-erasure prevention lug mechanism, a check is made to find if the state of the erroneous-erasure prevention lug is set to the prevention of erroneous erasure or to the permission of writing/erasure.

If it is found that the state of the erroneous-erasure prevention lug is set to the prevention of erroneous erasure, the procedure proceeds to step S74, where a display indicative of such a state, for example, a display "IN THIS CARD, ERRONEOUS-ERASURE PREVENTION LUG IS SET TO INHIBIT WRITING/ERASURE", is made at the display part 54. Then, the procedure proceeds to step S81.

In the step S75, as the card is not provided with the erroneous-erasure prevention lug mechanism, a register in the inside of the card is read, and a check is made to find if the state of the register is set to the inhibition of writing/erasure. If it is found that the state of the register is set to the inhibition of writing/erasure, the procedure proceeds to step S76, where a display indicative of such a state, for example, a display "IN THIS CARD, REGISTER IS SET TO INHIBIT WRITING/ERASURE", is made at the display part 54. Then, the procedure proceeds to step S81.

If it is found in the step S73 or the step S75 that the writing/erasure in the card is possible, the procedure proceeds to step S77. In the step S77, management information of files written in the card is read. Here, the management information of files is information to be set in the card for setting all of the files collectively to the inhibition of writing, or for setting an individual file to the inhibition of writing.

In the next step S78, a check is made to find if all of the files written in the card are set to the inhibition of writing. If it is found that all of the files are set to the inhibition of writing, the procedure proceeds to step S79, where a display indicative of such a state, for example, a display "ALL FILES IN THIS CARD ARE SET TO INHIBITION OF WRITING/ERASURE", is made at the display part 54. Then, the procedure proceeds to step S81.

If it is found in the step S78 that not all of the files are set to the inhibition of writing, i.e., if at least a part of the files recorded in the card are set to the permission of writing/erasure, the procedure proceeds to step S80.

In the step S80, a check is made to find if the recording apparatus is in the recording mode. If it is found that the recording apparatus is in the recording mode, the procedure proceeds to the branch (B) shown in FIG. 2. If it is found that the recording apparatus is not in the recording mode, the procedure proceeds to the branch (C) shown in FIG. 4. In other words, if this sequence is executed from the step S6 shown in FIG. 2, the procedure proceeds to the branch (B), and, if this sequence is executed from the step S210 shown in FIG. 4, the procedure proceeds to the branch (C).

Further, also in the step S81, a check is made to find if the recording apparatus is in the recording mode. If it is found that the recording apparatus is in the recording mode, the procedure proceeds to the branch (A) shown in FIG. 2. If it is found that the recording apparatus is not in the recording mode, the procedure proceeds to the branch (D) shown in FIG. 2.

In the foregoing, the operation flow of the process for checking the state of the memory card (the medium-state checking process) has been described.

Next, the operation of the erasure process in the step S21 shown in FIG. 2 will be described in detail with reference to the flow chart of FIG. 4.

Figure 4:
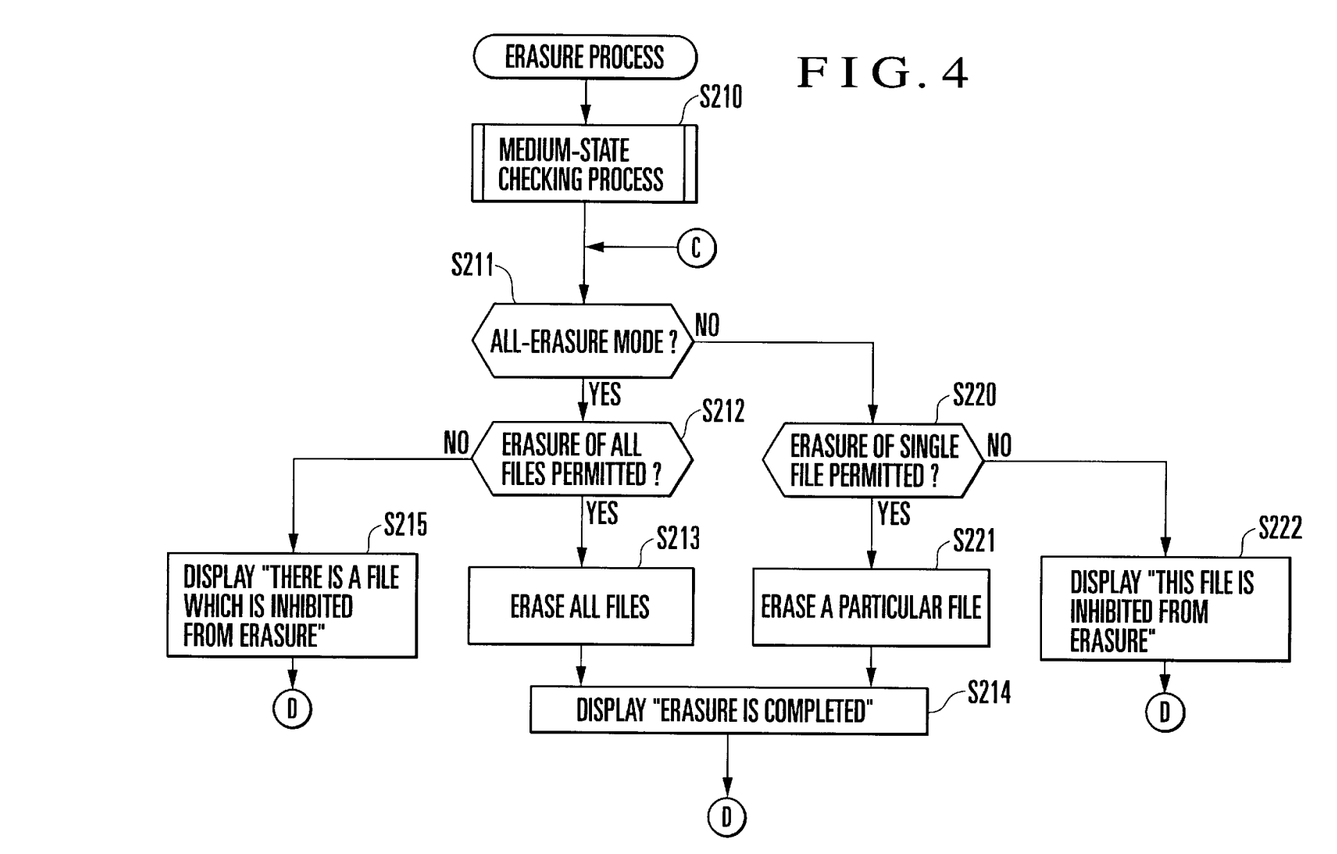
FIG. 4 is a flow chart showing the action of an erasure process in the recording apparatus according to the embodiment of the invention.

Referring to FIG. 4, in step S210, the medium-state checking process, which has been described with reference to FIG. 3, is executed.

In the medium-state checking process, if it is found that the inhibition of erasure of the entire card is set by the exterior detection method, if it is found that the inhibition of erasure of the entire card is set by the internal flag detection method, or if it is found that the inhibition of erasure of all the files in the card is set by the file management information, the procedure returns to the branch (D) shown in FIG. 2. Accordingly, the procedure proceeds to step S211 only when the erasure of at least a part of the files in the card is permitted.

In step S211, a check is made to find if the erasure mode of the recording apparatus is an all-erasure mode in which all the files in the card are erased or a single-erasure mode in which a particular file as designated is erased. If it is found that the erasure mode of the recording apparatus is the all-erasure mode, the procedure proceeds to step S212. If it is found that the erasure mode of the recording apparatus is the single-erasure mode, the procedure proceeds to step S220.

In step S212, a check is made, on the basis of a result of the medium-state checking process in the step S210, to find if the erasure of all files is permitted. If there are no files set to the inhibition of erasure in the card, the procedure proceeds to step S213, where all the files are erased. Then, the procedure proceeds to step S214.

In step S214, a display indicative of the completion of the erasure, for example, a display "ERASURE IS COMPLETED", is made at the display part 54. Then, the procedure proceeds to the branch (D) shown in FIG. 2.

If it is found in the step S212 that there is at least one file set to the inhibition of erasure in the card, the procedure proceeds to step S215, where a display indicative of such a state, for example, a display "THERE IS A FILE WHICH IS INHIBITED FROM ERASURE", is made at the display part 54. Then, the procedure proceeds to the branch (D) shown in FIG. 2.

In step S220, as the erasure mode of the recording apparatus is the single-erasure mode, a check is made, on the basis of a result of the medium-state checking process in the step S210, to find if the erasure of a particular file as designated is permitted. If so, the procedure proceeds to step S221, where the particular file as designated is erased. Then, the procedure proceeds to step S214.

In step S214, a display indicative of the completion of the erasure, for example, a display "ERASURE IS COMPLETED", is made at the display part 54. Then, the procedure proceeds to the branch (D) shown in FIG. 2.

If it is found in the step S220 that the erasure of the particular file as designated is not permitted, the procedure proceeds to step S222, where a display indicative of the impossibility of the erasure of the particular file, for example, a display "THIS FILE IS INHIBITED FROM ERASURE", is made at the display part 54. Then, the procedure proceeds to the branch (D) shown in FIG. 2.

As described above, according to the present embodiment, in a case where a recording medium having an erroneous-erasure prevention mechanism on an exterior thereof is used, the determination of the erroneous-erasure prevention is performed on the basis of only the erroneous-erasure prevention mechanism without performing the determination of the erroneous-erasure prevention on the basis of an internal flag. Therefore, it is possible to perform the determination of the erroneous-erasure prevention simply and clearly.

Further, in a case where a recording medium not having the erroneous-erasure prevention mechanism on an exterior thereof is used, the determination of the erroneous-erasure prevention is performed on the basis of only an internal flag without performing the determination of the erroneous-erasure prevention on the basis of the erroneous-erasure prevention mechanism. Accordingly, the recording apparatus body is prevented from erroneously recording or erasing data, or the recording apparatus body is prevented from erroneously deciding the erroneous-erasure prevention to disable the use of the recording medium. Thus, it is possible to appropriately use the recording medium.

In addition, since an appropriate display is suitably made at the display part, whether a recording medium having an erroneous-erasure prevention mechanism on an exterior thereof is used or a recording medium having an internal flag serving as an erroneous-erasure prevention function is used, it is possible to appropriately judge for what reason the recording or erasure of data is impossible, without confusion.

Incidentally, while, in the present embodiment, a plurality of types of erroneous-erasure prevention mechanisms are provided in the respective memory cards, the recording medium is not limited to the memory cards. Thus, a plurality of types of erroneous-erasure prevention mechanisms may be provided in the respective cassettes in each of which a tape-shaped magnetic recording medium is contained, the respective cartridges in each of which a magneto-optical disk is contained, or the like.

Further, while, in the present embodiment, the recording apparatus is arranged to use both a recording medium having an erroneous-erasure prevention lug on an exterior thereof and a recording medium having an internal flag set for the determination of the erroneous-erasure prevention, the invention is applicable to a recording apparatus arranged to use both recording media having erroneous-erasure prevention lugs at the respective different portions thereof.

Further, while, in the present embodiment, the recording media have respective different types of erroneous-erasure prevention mechanisms, the invention is not limited to such recording media. Thus, the invention is applicable to recording media having respective different types of predetermined mechanisms, so that, when each of the recording media is attached to a recording apparatus, the recording apparatus is controlled on the basis of the state of the associated predetermined mechanism.

Further, while, in the present embodiment, the recording apparatus has an image pickup part, the invention is also applicable to a recording apparatus having no image pickup part.

Next, a second embodiment of the invention will be described. In the preceding first embodiment, the type-A card may have both the exterior detection method, such as an erroneous-erasure prevention lug mechanism, and the internal flag detection method. However, in that case, there is a possibility that the management information and the internal flag information do not coincide with the state of the erroneous-erasure prevention lug mechanism. For example, even if the internal flag in a card is set to the erroneous-erasure prevention by the operation of a recording apparatus body or a personal computer, it is easy to cancel the erroneous-erasure prevention by shifting the erroneous-erasure prevention lug with the card detached from the recording apparatus body.

Therefore, according to the second embodiment, in a system adapted to allow a card having both the exterior detection method and the internal flag detection method to be attached thereto, if one of the internal flag and the erroneous-erasure prevention lug mechanism has been set to the erroneous-erasure prevention, the system is made to regard the card as set to the erroneous-erasure prevention.

Figure 5:
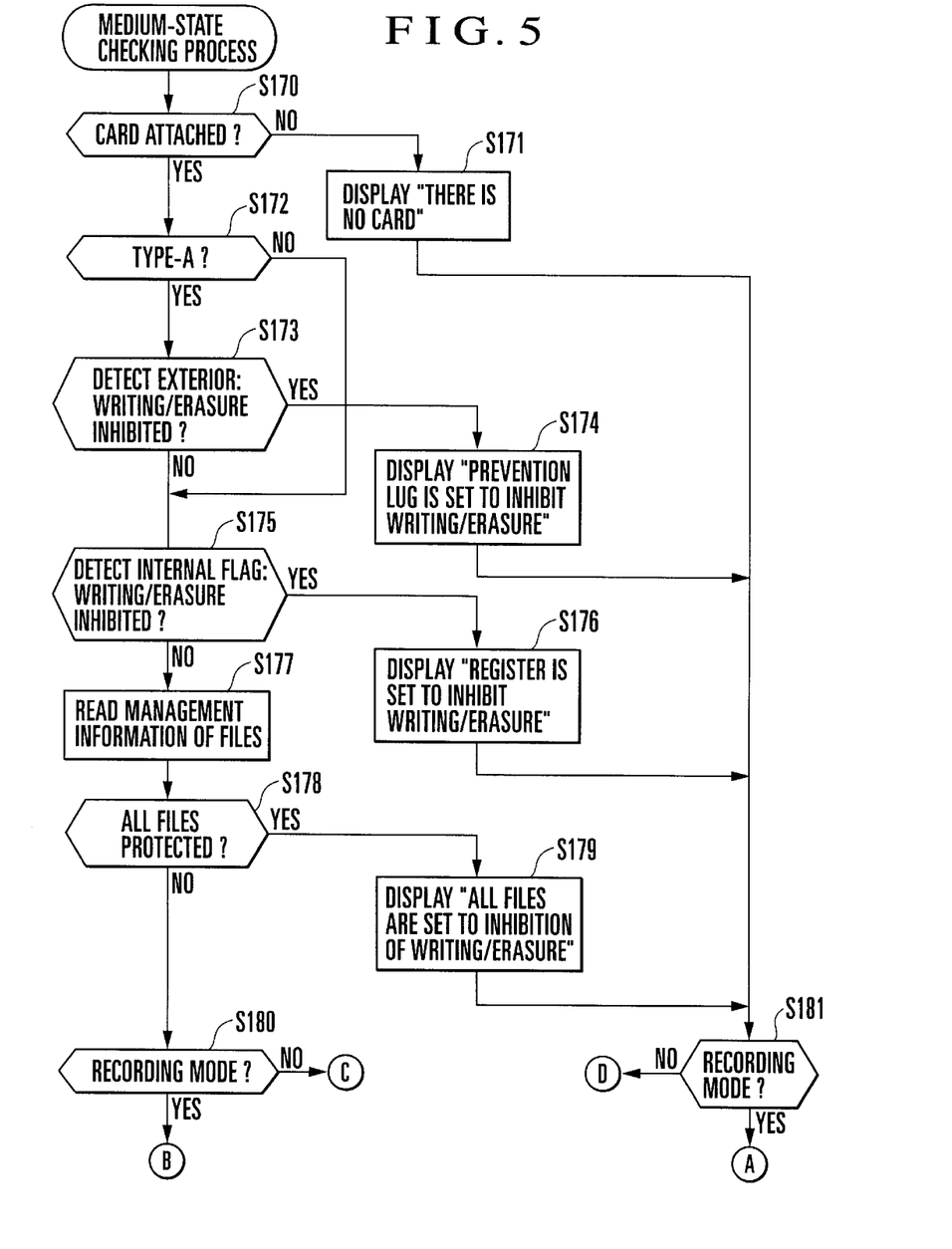
FIG. 5 is a flow chart showing the action of a medium-state checking process in a recording apparatus according to another embodiment of the invention.

FIG. 5 is a flow chart showing the operation flow of the medium-state checking process for checking the state of the card medium in the above-mentioned case according to the second embodiment. In the before-mentioned flow chart of FIG. 3, the internal flag is not subjected to detection in the case of the type-A card. On the other hand, in the flow chart of FIG. 5, in step S175, the internal flag is subjected to detection irrespective of the type-A card or the type-B card.

Then, the state of the erroneous-erasure prevention is displayed at the display part 54, for example, as a display "IN THIS CARD, ERRONEOUS-ERASURE PREVENTION LUG IS SET TO INHIBIT WRITING/ERASURE" if the erroneous-erasure prevention is set by the erroneous-erasure prevention lug mechanism provided on an exterior of the card, or as a display "IN THIS CARD, REGISTER IS SET TO INHIBIT WRITING/ERASURE" if the erroneous-erasure prevention is set by the internal flag of the card.

Incidentally, the actions of steps S170, S171, S173, S174 and S176 and steps S177 to S181 shown in the flow chart of FIG. 5 are the same as those of steps S70, S71, S73, S74 and S76 and steps S77 to S81 shown in the flow chart of FIG. 3, and are, therefore, omitted from the description here.

As described above, according to the second embodiment, in a case where a recording medium having no erroneous-erasure prevention mechanism on an exterior thereof is used, the determination of the erroneous-erasure prevention is performed on the basis of only an internal flag without performing the determination of the erroneous-erasure prevention on the basis of the erroneous-erasure prevention mechanism. Accordingly, the recording apparatus body is prevented from erroneously recording or erasing data, or the recording apparatus body is prevented from erroneously deciding the erroneous-erasure prevention to disable the use of the recording medium. Thus, it is possible to appropriately use the recording medium.

Further, according to the second embodiment, even in a case where a recording medium having an erroneous-erasure prevention mechanism on an exterior thereof further has an erroneous-erasure prevention register means in the inside thereof and the state of the erroneous-erasure prevention mechanism and the state of the erroneous-erasure prevention register means contradict each other, the recording apparatus body regards the recording medium as set to the erroneous-erasure prevention, if at least one of the erroneous-erasure prevention mechanism and the erroneous-erasure prevention register means is in the erroneous-erasure prevention state. Accordingly, there is a reliable effect on the erroneous-erasure prevention.

This arrangement has such an effect as to improve the security and reliability of a recording medium in a system in which priority is given to data in the recording medium, a system in which free writing in the recording medium is undesirable, a system in which the inputting of a password is required for writing/erasure, etc., because, in such a system, a possibility that writing/erasure is erroneously performed becomes low.

Further, according to the second embodiment, since an appropriate display is suitably made at the display part, whether a recording medium having an erroneous-erasure prevention mechanism on an exterior thereof is used or a recording medium having an internal flag serving as an erroneous-erasure prevention function is used, it is possible to appropriately judge for what reason the recording or erasure of data is impossible, without confusion.

Incidentally, while, in the second embodiment, a plurality of types of erroneous-erasure prevention mechanisms are provided in the respective memory cards, the recording medium is not limited to the memory cards. Thus, a plurality of types of erroneous-erasure prevention mechanisms may be provided in the respective cassettes in each of which a tape-shaped magnetic recording medium is contained, the respective cartridges in each of which a magneto-optical disk is contained, or the like.

Further, while, in the second embodiment, the recording apparatus is arranged to use both a recording medium having an erroneous-erasure prevention lug on an exterior thereof and a recording medium having an internal flag set for the determination of the erroneous-erasure prevention, the invention is applicable to a recording apparatus arranged to use both recording media having erroneous-erasure prevention lugs at the respective different portions thereof.

Further, while, in the second embodiment, the recording media have respective different types of erroneous-erasure prevention mechanisms, the invention is not limited to such recording media. Thus, the invention is applicable to recording media having respective different types of predetermined mechanisms, so that, when each of the recording media is attached to a recording apparatus, the recording apparatus is controlled on the basis of the state of the associated predetermined mechanism.

Further, while, in the second embodiment, the recording apparatus has an image pickup part, the invention is also applicable to a recording apparatus having no image pickup part.

As has been described in the foregoing, in a recording apparatus according to each of the above embodiments, it is possible to appropriately and clearly control the setting of the erroneous-erasure prevention and the cancellation of the erroneous-erasure prevention, without performing a troublesome setting operation.

Further, in a recording apparatus according to each of the above embodiments, it is possible to prevent the operator from making an erroneous judgment, by clearly indicating the reason for the setting of the erroneous-erasure prevention in a case where the presence or absence of the setting of the erroneous-erasure prevention is judged on the basis of a plurality of detection methods.

What is claimed is:

1. A recording apparatus to and from which each of a plurality of recording media is attachable and detachable, said recording apparatus comprising:

detection means for detecting a state of an exterior of the recording medium; and recording means for performing recording of data in the recording medium, wherein said recording means has a first mode of performing recording of data in the recording medium on the basis of a result of detection obtained by said detection means, and a second mode of performing recording of data in the recording medium without using a result of detection obtained by said detection means.

2. A recording apparatus according to claim 1, wherein the plurality of recording media include a recording medium having an erroneous-erasure prevention mechanism on an exterior thereof, and said detection means detects a state of said erroneous-erasure prevention mechanism.

3. A recording apparatus according to claim 1, wherein the plurality of recording media include a recording medium having a predetermined mechanism on an exterior thereof, said detection means detects a state of said predetermined mechanism, and said recording means is controlled according to a result of detection obtained by said detection means.

4. A recording apparatus according to claim 1, wherein said detection means detects a state of a predetermined position of the exterior of the recording medium.

5. A recording apparatus according to claim 1, wherein the plurality of recording media include a first recording medium having an erroneous-erasure prevention mechanism on an exterior thereof and a second recording medium not having said erroneous-erasure prevention mechanism on an exterior thereof, and said detection means detects a state of said erroneous-erasure prevention mechanism.

6. A recording apparatus according to claim 5, wherein said recording means comes into said first mode in response to attachment of said first recording medium, and comes into said second mode in response to attachment of said second recording medium.

7. A recording apparatus according to claim 5, wherein said second recording medium has a second erroneous-erasure prevention mechanism different from said first-mentioned erroneous-erasure prevention mechanism, and said recording apparatus further comprises:

second detection means for detecting a state of said second erroneous-erasure prevention mechanism.

8. A recording apparatus according to claim 7, wherein said recording means further has a third mode of performing recording of data in the recording medium without using a result of detection obtained by said second detection means, and a fourth mode of performing recording of data in the recording medium on the basis of a result of detection obtained by said second detection means.

9. A recording apparatus according to claim 8, wherein said recording means comes into said third mode in response to attachment of said first recording medium, and comes into said fourth mode in response to attachment of said second recording medium.

10. A recording apparatus according to claim 7, further comprising:

recording control means for controlling said recording means by determining permission or inhibition of recording in the recording medium, wherein said first recording medium further has said second erroneous-erasure prevention mechanism, and said recording control means inhibits said recording means from performing recording of data, when the permission or inhibition of recording based on a result of detection obtained by said first-mentioned detection means does not coincide with the permission or inhibition of recording based on a result of detection obtained by said second detection means.

11. A recording apparatus according to claim 7, wherein said second erroneous-erasure prevention mechanism is provided in the inside of said second recording medium.

12. A recording apparatus according to claim 7, wherein said second erroneous-erasure prevention mechanism includes register means for indicating permission or inhibition of erroneous-erasure prevention.

13. A recording apparatus according to claim 1, further comprising:

display means for displaying information concerning a result of detection obtained by said detection means.

14. A recording apparatus according to claim 7, further comprising:

display means for displaying information concerning a result of detection obtained by said first-mentioned detection means and a result of detection obtained by said second detection means.

15. A recording apparatus according to claim 1, wherein said recording means further erases data recorded in the recording medium.

16. A recording apparatus to and from which each of a first recording medium having an erroneous-erasure prevention mechanism on an exterior thereof and a second recording medium not having said erroneous-erasure prevention mechanism on an exterior thereof is attachable and detachable, said recording apparatus comprising:

detection means for detecting a state of the exterior of said first recording medium; and recording means for performing recording of data in each of said first recording medium and said second recording medium, wherein said recording means performs recording of data in said first recording medium on the basis of a result of detection obtained by said detection means in response to attachment of said first recording medium, and performs recording of data in said second recording medium without using a result of detection obtained by said detection means in response to attachment of said second recording medium.

17. A recording apparatus according to claim 16, wherein said second recording medium has a second erroneous-erasure prevention mechanism in the inside thereof, said recording apparatus further comprising:

second detection means for detecting a state of said second erroneous-erasure prevention mechanism, and wherein said recording means performs recording of data in said first recording medium on the basis of a result of detection obtained by said first-mentioned detection means in response to attachment of said first recording medium, and performs recording of data in said second recording medium on the basis of a result of detection obtained by said second detection means in response to attachment of said second recording medium.

18. An image pickup apparatus to and from which each of a plurality of recording media is attachable and detachable, said recording apparatus comprising:

image pickup means for picking up image data of an object;

recording means for recording the image data picked up by said image pickup means; and detection means for detecting a state of an exterior of the recording medium, wherein said recording means has a first mode of performing recording of the image data in the recording medium on the basis of a result of detection obtained by said detection means, and a second mode of performing recording of the image data in the recording medium without using a result of detection obtained by said detection means.

19. An image pickup apparatus according to claim 18, wherein the plurality of recording media include a recording medium having an erroneous-erasure prevention mechanism on an exterior thereof, and said detection means detects a state of said erroneous-erasure prevention mechanism.

20. An image pickup apparatus according to claim 18, wherein the plurality of recording media include a recording medium having a predetermined mechanism on an exterior thereof, said detection means detects a state of said predetermined mechanism, and said recording means is controlled according to a result of detection obtained by said detection means.

* * * * *

UNITED STATES PATENT AND TRADEMARK OFFICE
CERTIFICATE OF CORRECTION

PATENT NO. : 6,798,975 B1  Page 1 of 1
DATED : September 28, 2004
INVENTOR(S) : Nobuo Fukushima It is certified that error appears in the above-identified patent and that said Letters Patent is hereby corrected as shown below:

Column 6,
Line 45, delete "step S1" and insert -- step S11 --.

Signed and Sealed this

Twenty-fifth Day of April, 2006

JON W. DUDAS
*Director of the United States Patent and Trademark Office*